Feb. 4, 1941. J. C. CUNNINGHAM 2,230,528
SOLDER SPLASH REMOVER
Filed Jan. 29, 1937 2 Sheets-Sheet 1
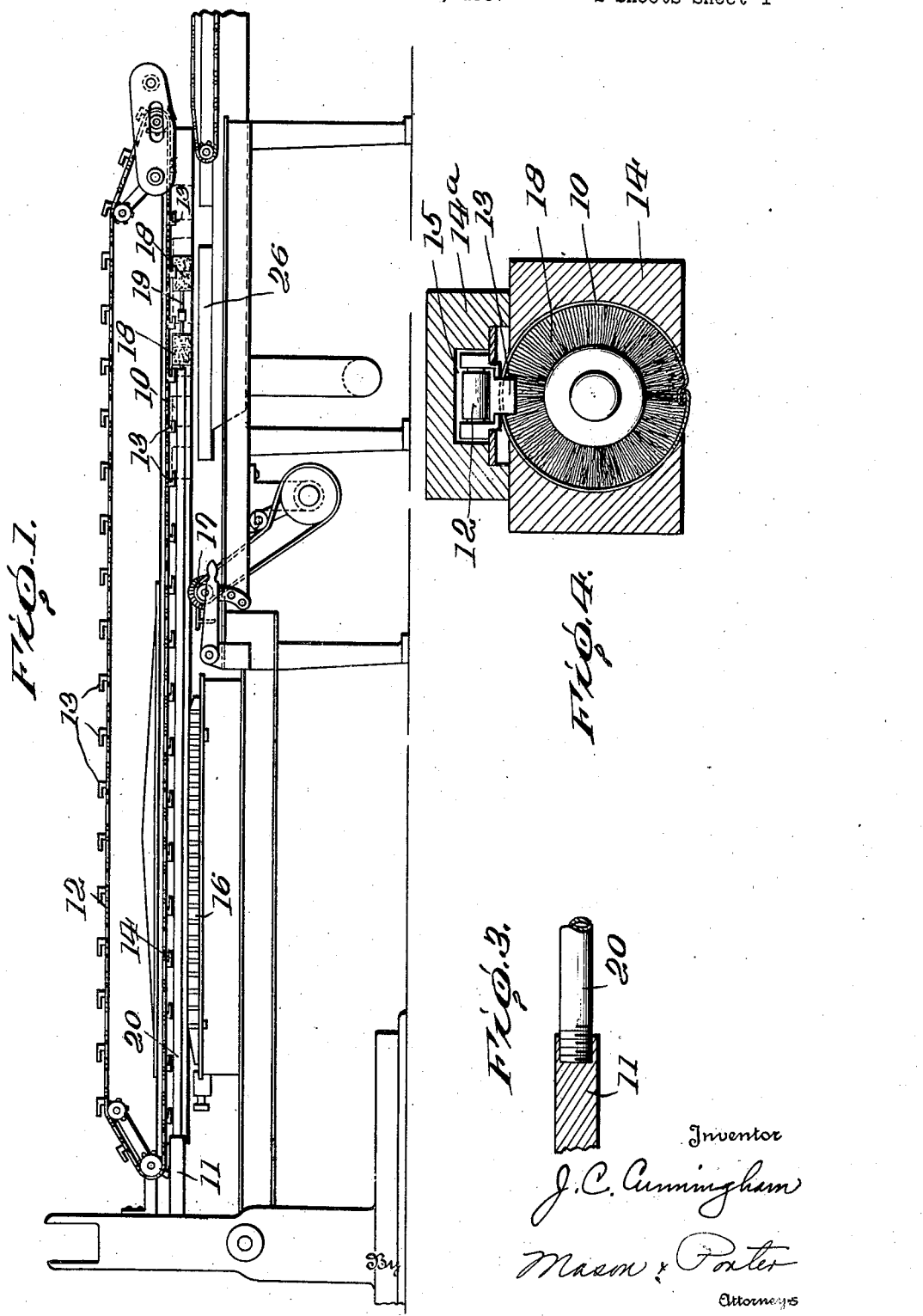
Inventor
J. C. Cunningham
Mason & Porter
Attorneys Feb. 4, 1941.  J. C. CUNNINGHAM  2,230,528
SOLDER SPLASH REMOVER
Filed Jan. 29, 1937  2 Sheets-Sheet 2
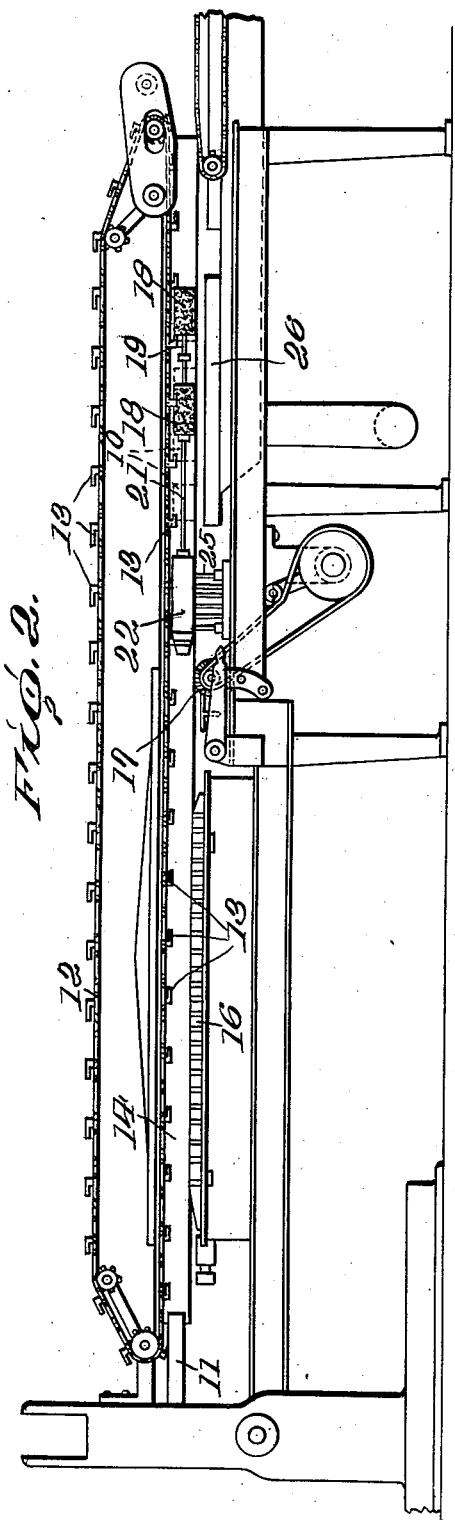
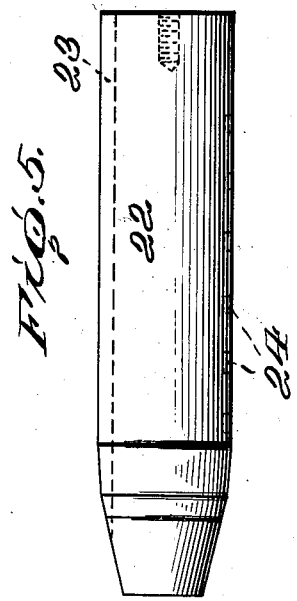
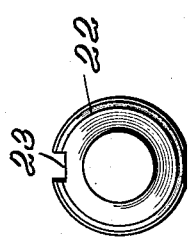
Inventor
J. C. Cunningham
By Mason & Porter
Attorneys Patented Feb. 4, 1941

2,230,528

UNITED STATES PATENT OFFICE 2,230,528

SOLDER SPLASH REMOVER

Joseph C. Cunningham, Camden, N. J., assignor to Continental Can Company, Inc., New York, N. Y., a corporation of New York Application January 29, 1937, Serial No. 123,071

1 Claim. (Cl. 113—97)

The invention relates to new and useful improvements in a machine for applying solder to the side seams of can bodies.

In the manufacture of can bodies, it is customary to apply solder to the side seam by means of a solder roll which rotates in a bath of molten solder while its upper surface is in wiping contact with the side seam as it passes longitudinally thereover. After the can body leaves the solder roll, it passes over a rotating brush which wipes the outside of the seam and removes surplus solder therefrom. It sometimes happens, however, that splashes of molten solder are thrown onto the inner surface of the body. The solder adhering to the brush is sometimes thrown into the path of the rapidly traveling can body and lodges on the inner surface of the can body. If the can body is coated on its inner face with enamel, the solder globules lodging thereon will adhere so firmly as to remain on the surface when the can body is finished, filled and sealed. This is objectionable for many reasons.

With these conditions in mind, it is an object of the present invention to provide suitable means for removing splashes of solder which may be deposited upon the inside surface of the can body during the solder wiping operation. This means includes a brush or similar unit which is so supported that the can body during the travel of the latter through the soldering machine and after wiping passes over the brush, which is of such dimensions that it comes into wiping contact with the entire inside surface of said body.

A further object of the invention is to locate the inside brush at such a point behind the solder roll and outside wiper that any splashes which adhere to the inside surface of the body will become solidified before they reach the inside brush. This is for the reason that any solder that might reach the inside brush in a molten state would be spread over the inside surface of the body instead of being removed therefrom.

The construction of the invention and the operation thereof will be more particularly explained in connection with the accompanying drawings, in which—

Fig. 1 is a partly diagrammatic side view of a side seaming machine, with the side of the solder horse removed to show the position of the splash remover.

Fig. 2 is a similar view showing a modified means for supporting the front end of the splash remover.

Fig. 3 is an enlarged detail view of the means for connecting the splash remover to the stub horn, as shown in Fig. 1.

Fig. 4 is an enlarged cross sectional view showing an inside brush as it passes through a can body, together with means for guiding the latter.

Fig. 5 is an enlarged side view of the inside plug shown in Fig. 2.

Fig. 6 is an end view of the inside plug.

In order to explain the invention, it is not necessary to go into the details of the side seaming machine. It may be stated, however, that the can bodies 10, after being formed, are fed over a stub horn 11, shown in Figs. 1 and 2, and are picked up by an endless chain 12. The chain 12 is provided with spaced lugs 13 which engage the can bodies and convey the same in succession through the solder horse 14. The chain 12 is guided by a bar 14a located above the solder horse. The solder is applied to the side seam by a solder roll 16 rotating in a solder bath. After the can bodies leave the roll 16, the surplus solder, while still molten, is wiped from the outside of the seam by a rotating brush 17.

In the drawings, the inside splash remover is shown as comprising two wire brushes 18, similar to the ordinary flue brush, of proper diameter to make a wiping contact with the entire inside surface of the can body so as to remove particles of solder adhering to any part thereof. These brushes are connected together by a jointed pipe or rod 19.

In the form of the invention shown in Fig. 1, the front end of the first brush 18 is connected to the rear end of a pipe 20, which is secured at its front end to the stub horn 11 and supported thereby.

In the modification shown in Fig. 2, the first brush is connected by a short pipe or rod 21 to an aluminum plug 22. This plug is formed on its upper side with a channel 23 for clearance of the chain lugs 13 and on its lower side with recesses 24 to receive reciprocable supporting bars 25 which are controlled in the same manner as the usual inside horn support. The machine also has the usual cooler pipe 26.

It is important to locate the brushes 18, as shown, an appreciable distance from the outside wiper 17 and above the cooler pipe 26, so that particles of molten solder thrown by the outside wiper to the inside of the can body will have time to become partially cooled and will be removed in a solid state, instead of being spread over the inside surface of the body.

It is to be understood that the specific details of construction herein shown and described are for the purpose of illustration only, and that the invention also includes such other modifications as may fall within the scope of the appended claim.

I claim:

A side seam soldering machine including in combination, means for applying solder to the outside only of the side seam of the can body, a rotating brush engaging the outer surface of the can body for wiping the surplus solder from the side seam, means for cooling the can body and any particles of solder thrown from the brush and adhering to the inner surface of the can body, brushing means contacting with the entire inner surface of the can body after it has left the wiper and the cooling means for removing particles of solder adhering to the inner surface, and means for conveying the can bodies in succession to the solder applying means, the wiping means, the cooling means, and the solder removing means.

JOSEPH C. CUNNINGHAM.